(12) United States Patent
Maier et al.

(10) Patent No.: US 8,240,753 B2
(45) Date of Patent: Aug. 14, 2012

(54) MOTOR VEHICLE SEAT WITH PIVOTABLE WING RESTS AND SEAT ARRANGEMENT WITH SUCH A MOTOR VEHICLE SEAT

(75) Inventors: Jürgen Maier, Weitersweiler (DE); Jens Winter, Gau-Bischofsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 166 days.

(21) Appl. No.: 12/419,571

(22) Filed: Apr. 7, 2009

(65) Prior Publication Data

US 2009/0250983 A1 Oct. 8, 2009

(30) Foreign Application Priority Data

Apr. 8, 2008 (DE) .................. 10 2008 017 708

(51) Int. Cl.
*A47C 13/00* (2006.01)
(52) U.S. Cl. ................. 297/112; 297/411.36; 297/452.4
(58) Field of Classification Search .............. 297/115, 297/113, 112, 125, 238, 233, 232, 452.4, 297/334.1, 411.36, 284.9, 284.3, 284.8, 188.05
See application file for complete search history.

(56) References Cited

U.S. PATENT DOCUMENTS

| | | | |
|---|---|---|---|
| 90,613 A | 5/1869 | Vogel | |
| 557,063 A | 3/1896 | Faneuf | |
| 1,500,524 A | 7/1924 | Phillips | |
| 1,886,595 A | 11/1932 | Sandquist | |
| 2,621,708 A | 11/1949 | Luce, Jr. | |
| 2,584,481 A | * 2/1952 | Mast et al. | 297/115 |
| 2,688,524 A | 9/1954 | Hodgman et al. | |
| 2,720,658 A | * 10/1955 | Lea | 4/239 |
| 2,980,170 A | 4/1961 | Bechtold | |
| 3,094,354 A | 6/1963 | Bernier | |
| 3,328,077 A | 6/1967 | Krasinski | |
| 3,565,482 A | * 2/1971 | Blodee | 297/284.3 |
| 3,913,973 A | 10/1975 | Mintz et al. | |

(Continued)

FOREIGN PATENT DOCUMENTS

CH 265453 A 12/1949

(Continued)

OTHER PUBLICATIONS

USPTO, US Office Action for U.S. Appl. No. 12/420,528, mailed Apr. 1, 2011.

(Continued)

*Primary Examiner* — David Dunn
*Assistant Examiner* — David E Allred
(74) *Attorney, Agent, or Firm* — Ingrassia Fischer & Lorenz, P.C.

(57) ABSTRACT

A motor vehicle seat is provided with a backrest which can be pivoted from a substantially upright position of use into a substantially horizontal position of non-use. The backrest includes, but is not limited to a wing rest which in the position of non-use of the backrest can be pivoted from a lower armrest position of non-use about a pivot axis extending in seat direction into an upper armrest position of use to form an armrest. The wing rest includes, but is not limited to a support part as well as an upholstery part and between the support part and the upholstery part a height adjusting device for the height adjustment of the upholstery part relative to the support part is arranged.

18 Claims, 3 Drawing Sheets

U.S. PATENT DOCUMENTS

| | | | |
|---|---|---|---|
| 3,926,473 | A | 12/1975 | Hogan |
| 4,519,646 | A | 5/1985 | Leitermann et al. |
| 4,796,955 | A * | 1/1989 | Williams ............... 297/284.2 |
| 5,052,068 | A * | 10/1991 | Graebe ................... 5/654 |
| 5,161,854 | A | 11/1992 | Yokoto et al. |
| 5,193,765 | A | 3/1993 | Simpson et al. |
| 5,344,213 | A | 9/1994 | Koyanagi |
| 5,384,946 | A * | 1/1995 | Sundstedt et al. .......... 297/238 |
| 5,409,297 | A | 4/1995 | De Filippo |
| 5,558,398 | A * | 9/1996 | Santos ................. 297/284.3 |
| 5,722,703 | A * | 3/1998 | Iwamoto et al. .......... 292/1 |
| 5,771,539 | A | 6/1998 | Wahlstedt et al. |
| 5,788,324 | A | 8/1998 | Shea et al. |
| 5,834,946 | A | 11/1998 | Albrow et al. |
| 5,896,604 | A * | 4/1999 | McLean ................. 5/690 |
| 5,947,554 | A | 9/1999 | Mashkevich |
| 5,951,084 | A | 9/1999 | Okazaki et al. |
| 5,979,985 | A | 11/1999 | Bauer et al. |
| 6,000,742 | A | 12/1999 | Schaefer et al. |
| 6,003,927 | A * | 12/1999 | Korber et al. ............ 296/37.8 |
| 6,033,015 | A | 3/2000 | Husted |
| 6,039,141 | A | 3/2000 | Denny |
| 6,132,128 | A | 10/2000 | Burrows |
| 6,176,547 | B1 | 1/2001 | Francois et al. |
| 6,189,458 | B1 | 2/2001 | Rivera |
| 6,286,793 | B1 * | 9/2001 | Hirose et al. ............ 248/118 |
| 6,513,876 | B1 | 2/2003 | Agler et al. |
| 6,547,323 | B1 * | 4/2003 | Aitken et al. ............ 297/113 |
| 6,578,915 | B2 * | 6/2003 | Jonas et al. ............ 297/284.11 |
| 6,793,282 | B2 | 9/2004 | Plant et al. |
| 6,840,577 | B2 * | 1/2005 | Watkins ................. 297/284.9 |
| 6,896,331 | B2 | 5/2005 | Kassai et al. |
| 6,918,159 | B2 | 7/2005 | Choi |
| 7,104,609 | B2 | 9/2006 | Kim |
| 7,380,859 | B2 | 6/2008 | Gardiner |
| 7,419,216 | B2 | 9/2008 | Hunziker |
| 7,543,891 | B2 | 6/2009 | Chung |
| 7,677,656 | B2 | 3/2010 | Saberan et al. |
| 7,850,244 | B2 * | 12/2010 | Salewski ............... 297/411.32 |
| 7,967,386 | B2 | 6/2011 | Na |
| 2002/0089220 | A1* | 7/2002 | Achleitner et al. ........ 297/284.9 |
| 2002/0109388 | A1 | 8/2002 | Magnuson |
| 2004/0036339 | A1 | 2/2004 | Christoffel et al. |
| 2004/0084948 | A1 | 5/2004 | Glynn et al. |
| 2006/0001304 | A1* | 1/2006 | Walker et al. ............ 297/284.8 |
| 2006/0076795 | A1 | 4/2006 | Slade |
| 2007/0052264 | A1 | 3/2007 | Lee |
| 2008/0036258 | A1* | 2/2008 | Holdampf et al. ......... 297/284.9 |
| 2009/0230712 | A1 | 9/2009 | Maier et al. |
| 2009/0236885 | A1 | 9/2009 | Maier et al. |
| 2009/0250984 | A1* | 10/2009 | Maier ................... 297/232 |
| 2009/0250985 | A1* | 10/2009 | Maier ................... 297/257 |
| 2009/0250987 | A1* | 10/2009 | Maier ................... 297/257 |
| 2009/0267398 | A1* | 10/2009 | Na ...................... 297/378.1 |
| 2010/0244478 | A1 | 9/2010 | DePue |
| 2011/0133536 | A1 | 6/2011 | Junige et al. |
| 2011/0156452 | A1 | 6/2011 | Schumm et al. |

FOREIGN PATENT DOCUMENTS

| | | |
|---|---|---|
| DE | 916754 C | 8/1954 |
| DE | 1938500 U | 5/1966 |
| DE | 2509642 A1 | 9/1976 |
| DE | 2507848 A1 | 9/1979 |
| DE | 2935946 A1 | 3/1981 |
| DE | 8107888 U1 | 3/1981 |
| DE | 3147656 A1 | 6/1983 |
| DE | 3300993 A1 | 7/1984 |
| DE | 3619944 A1 | 12/1987 |
| DE | 4343242 A1 | 6/1995 |
| DE | 29517861 U1 | 1/1996 |
| DE | 29518897 U1 | 1/1996 |
| DE | 4441011 C1 | 3/1996 |
| DE | 19646470 A1 | 5/1998 |
| DE | 19746736 A1 | 4/1999 |
| DE | 19812137 A1 | 9/1999 |
| DE | 29915349 U1 | 1/2000 |
| DE | 20000479 U1 | 6/2001 |
| DE | 10012831 A1 | 9/2001 |
| DE | 20110317 U1 | 9/2001 |
| DE | 10052838 A1 | 5/2002 |
| DE | 10312041 A1 | 9/2004 |
| DE | 20320522 U1 | 10/2004 |
| DE | 10357630 A1 | 7/2005 |
| DE | 102004062942 A1 | 2/2006 |
| DE | 102004055569 A1 | 5/2006 |
| DE | 102005037785 A1 | 2/2007 |
| DE | 102005055138 A1 | 5/2007 |
| DE | 102006015180 A1 | 10/2007 |
| DE | 102006028453 A1 | 12/2007 |
| DE | 102008004232 B3 | 4/2009 |
| DE | 102008036227 A1 | 2/2010 |
| EP | 0104040 A2 | 3/1984 |
| EP | 0296939 A1 | 12/1988 |
| EP | 0566213 A2 | 10/1993 |
| EP | 0607758 A1 | 7/1994 |
| EP | 0943482 A2 | 9/1999 |
| EP | 0943483 A2 | 9/1999 |
| EP | 1728677 A1 | 12/2006 |
| EP | 1731351 A1 | 12/2006 |
| EP | 1772131 A1 | 4/2007 |
| FR | 1401166 A | 6/1965 |
| FR | 2816555 A1 | 5/2002 |
| JP | 59137832 U | 9/1984 |
| JP | 2004065762 A | 3/2004 |
| WO | 2004106108 A1 | 12/2004 |
| WO | 2006084393 A2 | 8/2006 |

OTHER PUBLICATIONS

USPTO, US Office Action for U.S. Appl. No. 12/419,848, mailed Apr. 8, 2011.

USPTO, US Office Action for U.S. Appl. No. 12/419,564, mailed Jun. 10, 2011.

Response to US Office Action issued in U.S. Appl. No. 12/420,528, dated Jul. 1, 2011.

Response to US Office Action issued in U.S. Appl. No. 12/419,848, dated Jul. 6, 2011.

USPTO, Notice of Allowance issued in U.S. Appl. No. 12/420,528, mailed Oct. 17, 2011.

USPTO, Office Action issued in U.S. Appl. No. 12/419,564, dated Nov. 21, 2011.

Response to U.S. Office Action for U.S. Appl. No. 12/419,564, dated Sep. 9, 2011.

USPTO, Final Office Action issued in U.S.Appl. No. 12/420,528, dated Nov. 20, 2011.

German Patent Office, German Search Report for Application No. 102008017708.3, dated Dec. 9, 2008.

German Patent Office, German Search Report for Application No. 102008017707.5, dated Apr. 22, 2009.

German Patent Office, German Search Report for Application No. 102008017712.1, dated Apr. 22, 2009.

German Patent Office, German Search Report for Application No. 102008017709.1, dated Apr. 22, 2009.

UK IPO, British Search Report for Application No. 0905934.6, dated May 13, 2009.

UK IPO, British Search Report for Application No. 0905929.6, dated Jul 10, 2009.

UK IPO, British Search Report for Application No. 0905935.3, dated Jul. 30, 2009.

UK IPO, British Search Report for Application No. 0905928.8, dated Jul. 30, 2009.

UK IPO, British Examination Report for Application No. 0905928.8, dated Feb. 1, 2012.

UK IPO, British Examination Report for Application No. 0905929.6, dated Feb. 7, 2012.

UK IPO, British Examination Report for Application No. 0905934.6, dated Feb. 17, 2012.

UK IPO, British Examination Report for Application No. 0905935.3, dated Mar. 7, 2012.

UK IPO, British Examination Report for Application No. 0905928.8, dated Nov. 18, 2011.

USPTO, Notice of Allowance issued in U.S. Appl. No. 12/420,528, mailed Mar. 20, 2012.
Response to US Office Action for U.S. Appl. No. 12/419,848, dated Mar. 20, 2012.
Response to US Office Action for U.S. Appl. No. 12/419,564, dated Feb. 21, 2012.
Chinese Patent Office, Chinese Office Action for Application No. 200910133083.0, date Mar. 31, 2012.

USPTO, Notice of Allowance issued in U.S. Appl. No. 12/420,528, dated Apr. 16, 2012.
USPTO, Office Action issued in U.S. Appl. No. 121419,848, dated Apr. 27, 2012.
USPTO, Non-final Office Action issued in U.S. Appl. No. 12/419,564, dated May 31, 2012.

* cited by examiner

MOTOR VEHICLE SEAT WITH PIVOTABLE WING RESTS AND SEAT ARRANGEMENT WITH SUCH A MOTOR VEHICLE SEAT

CROSS-REFERENCE TO RELATED APPLICATION

This application claims priority to German Patent Application No. 102008017708.3, filed Apr. 8, 2008, which is incorporated herein by reference in its entirety.

TECHNICAL FIELD

The present invention relates to a motor vehicle seat with a backrest that can be pivoted from a substantially upright position of use into a substantially horizontal position of non-use, and the backrest comprises a wing rest, which in the position of non-use of the backrest can be pivoted from a lower armrest position of non-use about a pivot axis extending in seat direction into an upper armrest position of use to form an armrest and which comprises a support part as well as an upholstery part. The present invention further relates to a seat arrangement with such a motor vehicle seat.

BACKGROUND

From the prior art motor vehicle seats with a backrest are known, and the backrest can be pivoted forward from a position of use into a position of non-use. The backrest or parts thereof pivoted into the position of non-use can subsequently be used as armrest for a neighboring motor vehicle seat.

EP 0 943 483 B1, for example, describes a motor vehicle seat within a seat arrangement comprising a backrest that can be folded forward. The backrest in turn comprises wing rests arranged laterally on a middle backrest part. The known backrests comprise a support part in form of a plurality of lever arms and an upholstery part fastened to the support part. The wing rests can be pivoted about a pivot axis extending in seat direction into an upper armrest position of use, when the backrest is in the position of non-use. For this purpose the support part or the lever arms of the respective wing rest is/are articulated in a pivotable manner on a further support plate which is provided on the middle backrest part. For height adjustment of the two wing rests a height adjusting device is further provided which is arranged in form of a joint quadrilateral with four joint axes between the middle backrest part and the support plate.

The known motor vehicle seat has proved itself but it is disadvantageous to the extent that the handling of the wing rests during their adjustment from the position of armrest non-use into the position of armrest use is more difficult. Moreover, the height adjustment of the known wing rests is more difficult once these have been moved into the position of armrest use. In addition the known mechanism for the adjustment of the wing rests is not usable or employable in as flexible a manner as would be desirable in order to make possible a particularly flexible adaptation of the vehicle seat to the respective vehicle occupant.

It is thus at least one object of the present invention to create a motor vehicle seat of the generic kind which guarantees particularly simple handling and easy adaptation to the respective vehicle occupant. The present invention is further based on the object of creating a seat arrangement with the advantages mentioned above. In addition, other objects, desirable features, and characteristics will become apparent from the subsequent summary and detailed description, and the appended claims, taken in conjunction with the accompanying drawings and this background.

SUMMARY

The motor vehicle seat according to an embodiment of the invention comprises a backrest that can be pivoted from a substantially upright position of use into a substantially horizontal position of non-use. The backrest further comprises at least one wing rest, which in the position of non-use of the backrest can be pivoted from a lower armrest position of non-used about a pivot axis extending in seat direction into an upper armrest position of use to form an armrest. The wing rest of the motor vehicle seat further comprises a support part on the one hand and an upholstery part on the other hand which are pivoted jointly when the wing rest is pivoted about the pivot axis extending in seat direction. A height adjusting device for height adjustment of the upholstery part relative to the support part is arranged between the support part and the upholstery part.

In contrast with the solution known from EP 0 943 483 B1, the height adjusting device is thus not arranged between the middle backrest part of the backrest and an additional support plate, but rather directly on the wing rest between its support part and its upholstery part. In this manner the height adjusting device is pivoted together with the support part and the upholstery part of the wing rest when the wing rest is pivoted about the pivot axis extending in seat direction. The consequence of this is that the handling of the motor vehicle seat during the height adjustment of the upholstery parts relative to the support part is simplified and more comfortable. On the other hand it is always possible to actuate the height adjusting device even when the wing rest is in the armrest position of non-use and the backrest in the substantially upright position of use. In this way, the upholstery parts of the wing rests can be displaced forward or backward relative to the remainder of the backrest by actuating the height adjusting device in order to adapt the backrest to the respective vehicle occupants. In this manner a substantially more flexible or versatile utilization of the mechanism for adjusting the wing rests is possible.

For the aforementioned reasons the height adjusting device in a preferred embodiment of the motor vehicle seat according to the invention can additionally be actuated in the position of use of the backrest and if applicable also in the position of non-use of the backrest. For this purpose, actuation means that are easily accessible can be provided for example on the motor vehicle seat.

In order to guarantee secure movement of the wing rest into the upper armrest position of use and secure the support of the upholstery part via the height adjusting device on the support part in a further preferred embodiment of the motor vehicle seat according to the invention is embodied rigidly, preferentially as rigid carrier plate.

In order to further make possible a movement of the wing rest from the armrest position of non-use into the armrest position of use along a predefined path, the support part of the pivotable wing rest in a further preferred embodiment of the motor vehicle seat according to the invention is arranged on a middle backrest part capable of being pivoted about the pivot axis.

In an advantageous embodiment of the motor vehicle seat according to the invention the support part has a back which in the position of use and the position of non-use of the backrest together with a back of the middle backrest part forms the back of the backrest.

According to a further advantageous embodiment of the motor vehicle seat according to the invention the back of the support part in the armrest position of use of the wing rest is located opposite the back of the middle backrest part. Thus, the wing rest upon pivoting from the armrest position of non-use into the armrest position of use describes a pivot movement in an angle between about 90° and about 180°. Preferentially, the back of the support part on reaching the armrest position of use of the wing rest rests on the back of the middle backrest part so that the support part of the wing rest is securely supported downwards on the back of the middle backrest part.

In a particularly preferred embodiment of the motor vehicle seat according to the invention the height adjusting device in the armrest position of use of the wing rest is arranged in height direction below the upholstery part, without the height adjusting device protruding in at least one transverse direction of the upholstery part. In this manner it is ensured at least on one side in transverse direction of the upholstery part or the motor vehicle seat that a vehicle occupant on a further motor vehicle seat adjacent in that transverse direction does not abut the height adjusting device as a result of which a risk of injury is largely excluded.

In a further preferred embodiment of the motor vehicle seat according to the invention the height adjusting device in the armrest position of use of the wing rest is arranged completely below the upholstery part in height direction. As already mentioned before, a risk of injury on all sides of the height adjusting device can be largely reduced through this.

In order to further exclude the risk of injury emanating from the height adjusting device a depression is provided in the upholstery part in a particularly advantageous embodiment of the motor vehicle seat according to the invention in which the height adjusting device in a lower position of the upholstery part relative to the support part is at least partially, preferentially entirely, accommodated.

According to a further preferred embodiment of the motor vehicle seat according to the invention the depression in the lowermost position of the upholstery part relative to the support part is closed off to the outside by the support part. In this lowermost position the upholstery part is thus located advantageously on the support part without a vehicle occupant reaching the height adjusting device with his/her fingers. In order to be nevertheless able to actuate the height adjusting device, suitable actuation means can be provided. Alternatively the height adjustment however can also be reached through pulling up or pressing down the upholstery part of the wing rest.

In a further particularly preferred embodiment of the motor vehicle seat according to the invention the height adjusting device comprises a cushion to the support part and the upholstery part that can be blown up and/or evacuated. In this manner the height of the upholstery part relative to the support part can be reached particularly easily through blowing up and/or evacuating of the cushion. In addition to this, an inflatable and/or evacuatable cushion has the advantage that it poses a particularly low risk of injury. The inflatable and/or evacuatable cushion can also be arranged between the support part and the upholstery part of the wing rest in such a space-filling manner that no gaps whatsoever result in which a vehicle occupant can unintentionally reach.

In a further advantageous embodiment of the motor vehicle seat according to the invention the height adjusting device comprises a joint quadrilateral with pivot axes.

According to a further advantageous embodiment of the motor vehicle seat according to the invention the joint quadrilateral has a first pivot lever which on the one hand is arranged on the support part pivotable about a first pivot axis and on the other hand on the upholstery part pivotable about a second pivot axis, and a second pivot lever which on the one hand can be pivoted about a third pivot axis on the support part and on the other hand is arranged on the upholstery part capable of being pivoted about a fourth pivot axis. Through this a particularly simple height adjusting device is realized which for example can be actuated by lifting or pressing down the upholstery parts of the wing rest.

In a further advantageous embodiment of the motor vehicle seat according to the invention the pivot axes of the joint quadrilateral are arranged parallel to one another.

According to a further advantageous embodiment of the motor vehicle seat according to the invention the pivot axes of the joint quadrilateral is arranged at a right angle to the seat direction in order to achieve particularly simple handling.

In a further particularly preferred embodiment of the motor vehicle seat according to the invention the motor vehicle seat comprises two wing rests of the mentioned kind each arranged on the middle backrest part in a transverse direction. In this manner the motor vehicle seat can be utilized for both embodying an armrest for a further motor vehicle seat arranged in the first transverse direction next to the motor vehicle seat as well as for embodying an armrest for a further motor vehicle seat arranged in the second transverse direction next to the motor vehicle seat.

In order to make possible particularly flexible utilization of the motor vehicle seat within a vehicle interior the wing rests in a further preferred embodiment of the motor vehicle seat according to the invention can be pivoted about the respectively applicable pivot axis independently of each other. Alternatively or supplementary the upholstery parts of the two wing rests can be adjusted in height independently of one another.

The seat arrangement according to an embodiment of the invention comprises a first motor vehicle seat of the type mentioned above. A second motor vehicle seat is additionally provided, and the first motor vehicle seat and the second motor vehicle seat are arranged in a seat row next to each other. A wing rest of the first motor vehicle seat is arranged on the side of the first motor vehicle seat facing the second motor vehicle seat and can thus be utilized to form an armrest for the second motor vehicle seat.

In a preferred embodiment of the seat arrangement according to the invention a third motor vehicle seat is further provided in the seat row, and the first motor vehicle seat is arranged between the second and third motor vehicle seat in the seat row. In this manner the one wing rest can be utilized to form an armrest for the second motor vehicle seat and the other wing rest to form an armrest for the third motor vehicle seat.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
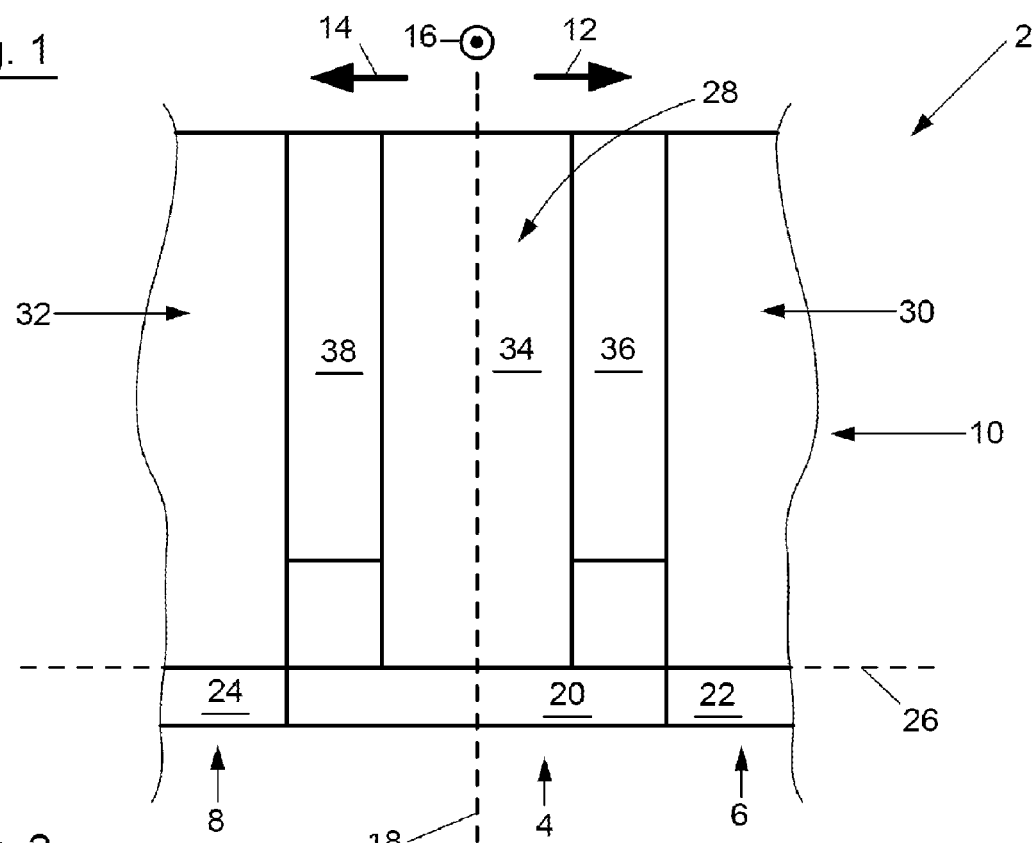
FIG. 1 a schematic front view of the seat arrangement according to an embodiment of the invention with the backrest in the position of use.

FIG. 1 shows a front view of the seat arrangement 2 according to an embodiment of the invention. The seat arrangement 2 comprises a middle first motor vehicle seat 4, a second motor vehicle seat 6 and a third motor vehicle seat 8 which are arranged next to one another in a seat row 10. Here, the second motor vehicle seat 6 is arranged in the first transverse direction 12 next to the first motor vehicle seat 4, while the third motor vehicle seat 8 is arranged in the opposite second transverse direction 14 next to the first motor vehicle seat 4. The seat direction 16 is identical for all motor vehicle seats 4, 6, 8 and in FIG. 1 corresponds to the normal of the drawing sheet. In addition to this, the height direction 18 of the seat arrangement or the motor vehicle seats 4, 6, 8 is indicated in FIG. 1 by means of a dashed normal axis.

The first motor vehicle seat 4 constitutes an embodiment of the motor vehicle seat according to the invention, while the motor vehicle seats 6, 8 can be conventional motor vehicle seats. Alternatively however the second and third motor vehicle seat 6, 8 can also be embodied in the type of the first motor vehicle seat 4. All motor vehicle seats 4, 6, 8 each comprise a seat part 20, 22, 24 as well as a backrest 28, 30, 32 which is arranged on the respective seat part 20, 22, 24 in a manner capable of being pivoted about a first pivot axis 26. The backrests 28, 30, 32 can be pivoted about the pivot axis 26 independently of one another.

The backrest 28 of the first motor vehicle seat 4 is substantially composed of a middle backrest part 34 and two wing rests 36, 38 attached laterally thereon. While the wing rest 36 in transverse direction 12 is arranged laterally on the middle backrest part 34 and thus faces the second motor vehicle seat 6, the wing rest 38 in transverse direction 14 is arranged laterally on the middle backrest part 34 and thus faces the third motor vehicle seat 8.

Figure 2:
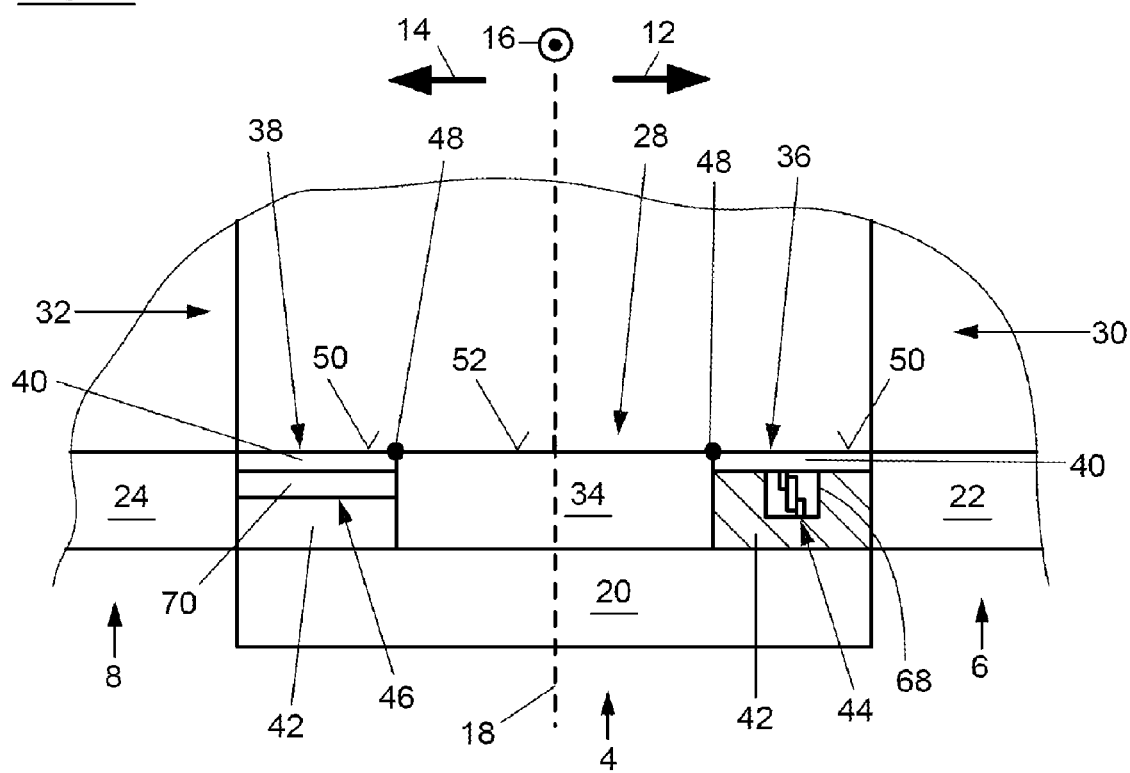
FIG. 2 the seat arrangement of FIG. 1 with the backrest in the position of non-use.

The backrest 28 of the first motor vehicle seat 4 can be pivoted in the substantially upright position of use, which is shown in FIG. 1, can be pivoted forward in seat direction 16 about the first pivot axis 26 into a substantially horizontal position of non-use, which is shown in FIG. 2. As is shown in FIG. 2, the seat part 20 of the first motor vehicle seat 4 during the pivot movement of the backrest 28 about the pivot axis 26 is lowered downwards in height direction 18 so far that the top of the seat part 20 is arranged below or at a height with the bottom of the seat parts 22, 24 of the second and third motor vehicle seats 6, 8 which function will still be discussed in more detail later on.

From FIG. 2 it is further evident that the wing rests 36, 38 are each composed of a support part 40, an upholstery part 42 and a height adjusting device 44 and 46 respectively arranged between the support part 40 and the upholstery part 42. In principle, the height adjusting devices 44, 46 of the wing rests 36, 38 of the same motor vehicle seat 4 should be embodied identically, but in FIG. 2 two different embodiments of the height adjusting devices 44, 46 are shown for illustration, while their construction and operation will be discussed in more detail later on. The support part 40 is embodied as a rigid carrier plate and arranged, capable of being pivoted about a second pivot axis 48, on the middle backrest part 34. The support parts 40 each have a back 50 which in the position of use (FIG. 1) and the position of non-use (FIG. 2) of the backrest 28 which, together with a back 52 of the middle backrest part 40, form the back of the backrest 28.

Figure 3:
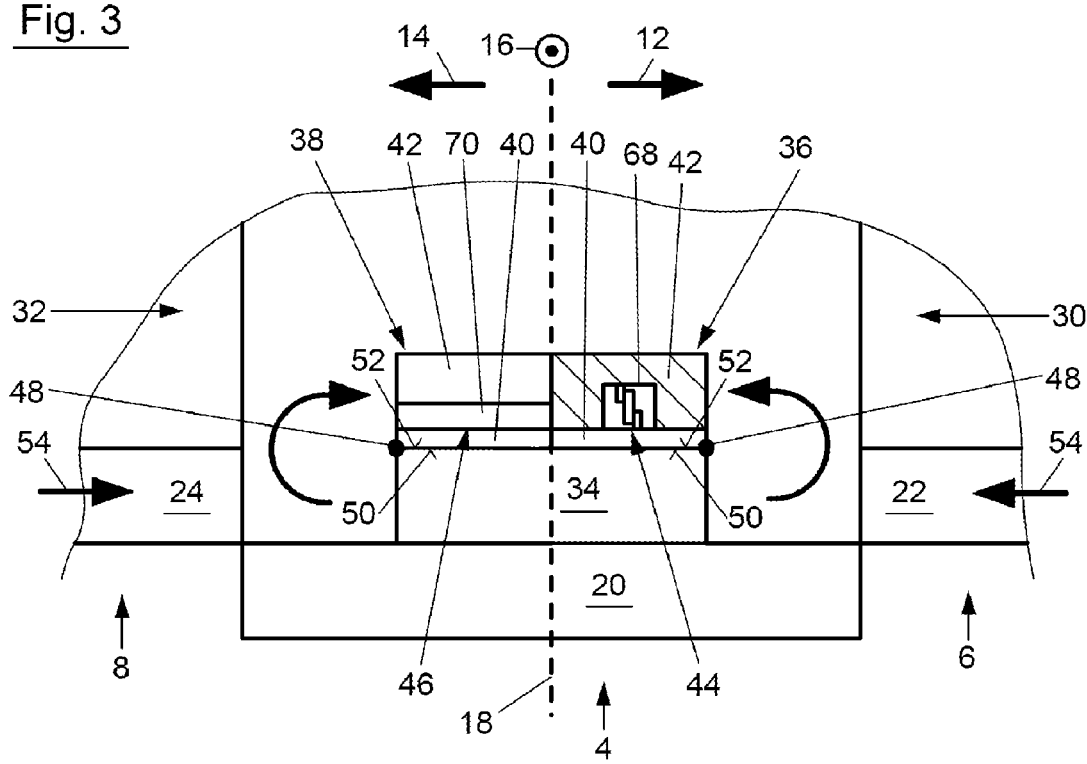
FIG. 3 the seat arrangement of FIG. 2 with the wing rests in the armrest position of use.

In FIG. 2 the wing rests 36, 38 are located in a lower armrest position of non-use, in which the wing rests 36, 38 are arranged at the sides of the middle backrest part 34. Starting out from this lower armrest position of non-use the wing rests 36, 38 can be pivoted about the pivot axes 48 extending in seat direction 16 into an upper position of armrest use which is shown in FIG. 3. In the upper position of armrest use the upholstery parts 42 of the wing rests 36, 38 each form an armrest for the second motor vehicle seat 6 and the third motor vehicle seat 8 respectively. Here, the back 50 of the support parts 40 in the armrest position of use of the wing rests 36, 38 is supported on the back 52 of the middle backrest part 34, as is shown in FIG. 3. Since the seat part 20 during the pivoting of the backrest 28 in the position of non-use shown in FIG. 2 is lowered and the width of the backrest 28 in transverse direction 12 and 14 respectively has been shortened into the armrest position of use shown in FIG. 3 because of the pivoting of the wing rests 36, 38, the second motor vehicle seat 6 and the third motor vehicle seat 8 can be displaced in transverse directions 14 and in transverse direction 12 respectively in order to be arranged nearer to the wing rests 36, 38 as is indicated in FIG. 3 through the arrows 54.

Figure 4:
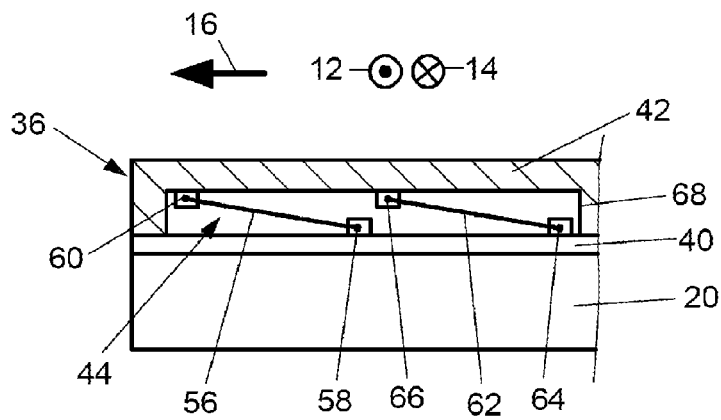
FIG. 4 a lateral view of the height adjusting device of FIG. 2 and FIG. 3 in a first embodiment.

Making reference to FIG. 3 and FIG. 4, the construction of the height adjusting device 44 in the wing rest 36 is explained first. The height adjusting device 44 comprises a first pivot lever 56, which on the one hand is arranged capable of being pivoted about a first pivot axis 58 on the support part 40 and on the other hand is arranged capable of being pivoted about a second pivot axis 60 on the upholstery part 42, and a second pivot lever 62, which on the one hand is arranged capable of being pivoted about a 3rd pivot axis 64 on the support part 40 and on the other hand is arranged capable of being pivoted about a fourth pivot axis 66 on the upholstery part 42. The pivot axes 58, 60, 64, 66 forming a joint quadrilateral of the height adjusting device 44 are arranged parallel to one another and extend at a right angle to the seat direction 16.

In the side of the upholstery part 42 facing the support part 40 a depression 68 is provided in which the height adjusting device 44 in the lower position of the upholstery part 42 shown in FIG. 4 is entirely accommodated. In this lowermost position of the upholstery part 42 the depression 68 is closed off to the outside through the plate-shaped support part 40, so that the vehicle occupant with his fingers cannot reach into the region of the pivot levers 56, 52 of the height adjusting device 44.

Figure 5:
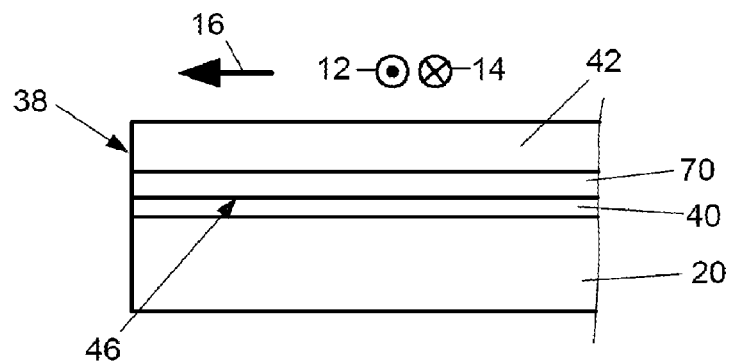
FIG. 5 a lateral view of the height adjusting device of FIG. 2 and FIG. 3 in a second embodiment.

In the following, the alternative embodiment of the height adjusting device 46 making reference to FIG. 3 and FIG. 5 is additionally explained. Instead of a joint quadrilateral with pivot levers the height adjusting device 46 substantially comprises an inflatable and/or evacuatable cushion 70, which is arranged between the support part 40 and the upholstery part 42 of the wing rest 38. Because of this, the height of the upholstery part 42 can be changed relative to the support part 40 through blowing-up and/or evacuating of the cushion 70.

Both embodiments of the height adjusting device 44 and 46 are shown in the armrest position of use which is shown in FIG. 3 to FIG. 8 in height direction 18 are arranged below the respective upholstery part 40, 42, without these protruding in at least one transverse direction 12, 14 of the upholstery part 42. Here, the height adjusting devices 44, 46 in the armrest position of use of the respective wing rest 36, 38 are arranged in height direction 18 entirely below the upholstery part 42, as a result of which it is ensured that a vehicle occupant on the second or third motor vehicle seat 6, 8 does not abut against the respective height adjusting device 44, 46. The risk of injury is minimized as a result.

Figure 6:
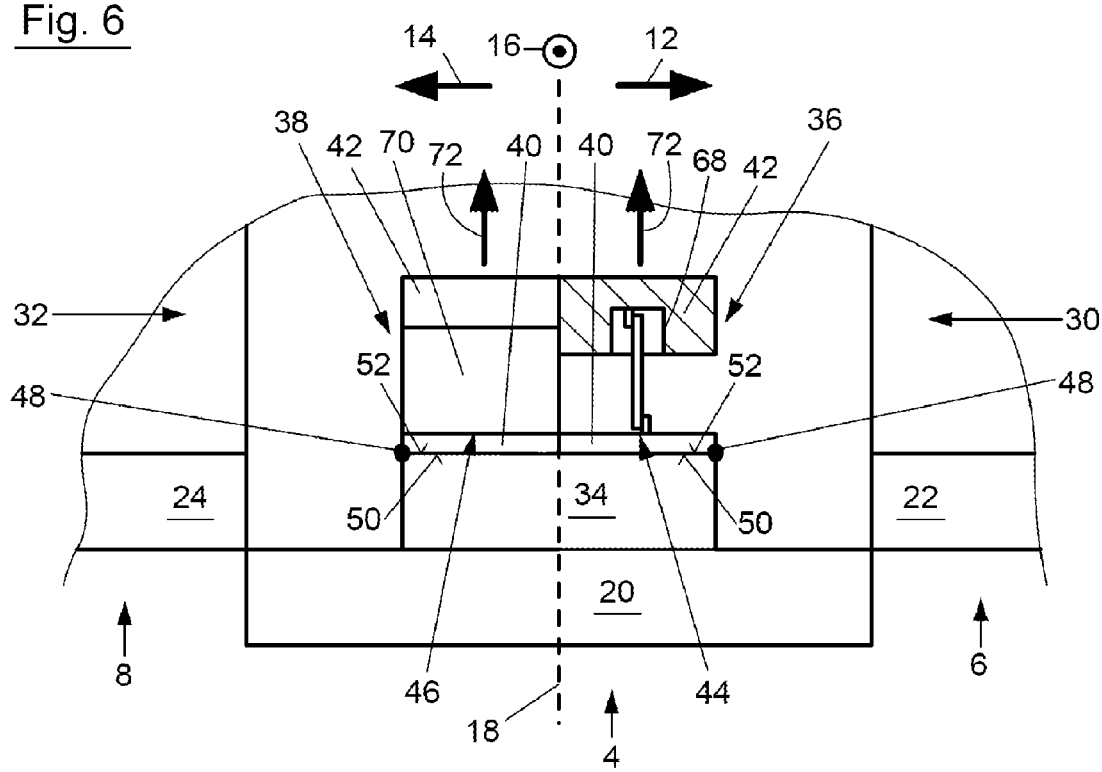
FIG. 6 the seat arrangement of FIG. 3 with the upholstery parts of the wing rests in an upper position.
Figure 7:
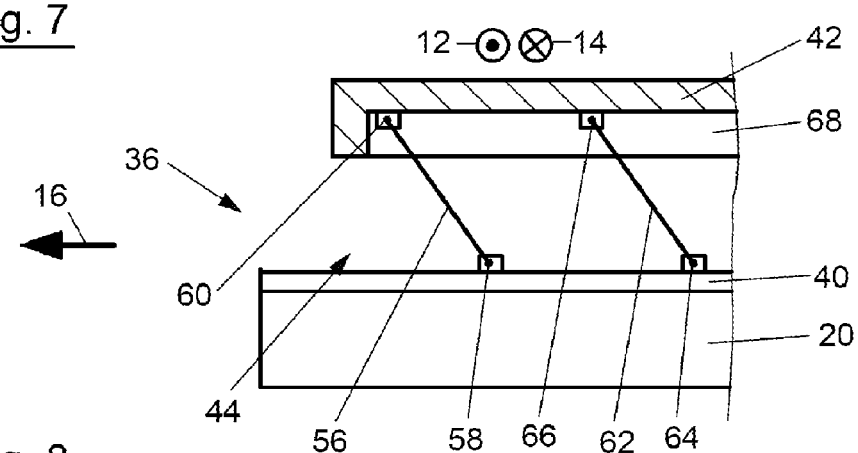
FIG. 7 the height adjusting device of FIG. 4 with the upholstery part in an upper position.
Figure 8:
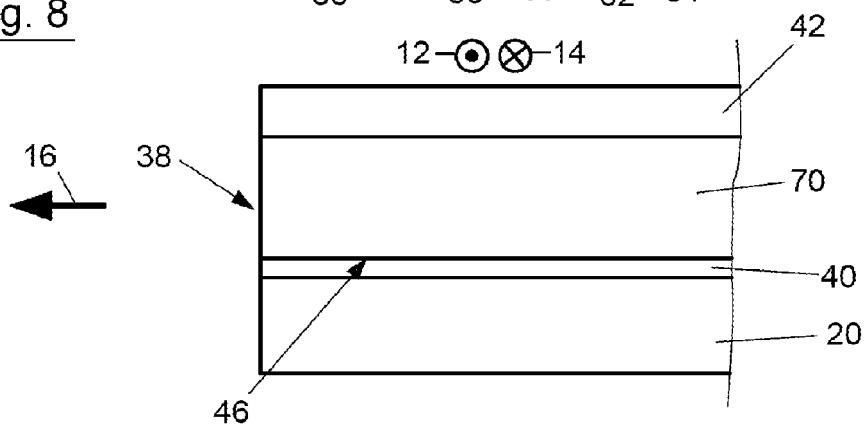
FIG. 8 the height adjusting device of FIG. 5 with the upholstery part in an upper position.

Thanks to the height adjusting device 44 and 46 the upholstery part 42 can be moved relative to the support part 40 from the lowermost position shown in FIG. 3 to FIG. 5 into an upper position shown in FIG. 6 to 8 as is indicated by means of the arrows 72. Here, the height adjustment of the upholstery part 42 of the wing rest 36 is effected by lifting the upholstery part 42, as a result of which, the pivot levers 56, 62 are pivoted about the corresponding pivot axes 58, 60 and 64, 66 respectively, as is visible more preferably in FIG. 7. The height adjustment of the upholstery part 42 of the wing rest 38 is simply effected through blowing up the cushion 70, while the lowering would have to be effected accordingly through venting or evacuating the cushion 70.

It must be particularly emphasized that the wing rests 36, 38 can be pivoted independently of each other about the respective corresponding pivot axis 48 extending in seat direction (FIG. 3). In addition to this the upholstery parts 42 of the wing rests 36, 38 can also be adjusted in height independently of each other through height adjusting devices 44 and 46 respectively separated from each other (FIG. 6).

A further particularly advantageous feature of the motor vehicle seat 4 consists in that the height adjusting devices 44, 46 can also be actuated when the backrest 28 of the first motor vehicle seat 4 is in the position of use shown in FIG. 1. Because of this, the upholstery parts 42 of the two wing rests 36, 38 in the position of use of the backrest 28 of FIG. 1 can be displaced forward or against the seat direction 16 to the back through the height adjusting devices 44, 46 in order to adapt the backrest 28 to the vehicle occupants. In this manner a particularly flexible utilization of the height adjusting devices 44, 46 of the first motor vehicle seat 4 is possible.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle seat, comprising:
    a backrest adapted to be pivoted about a first pivot axis from a first backrest position into a second backrest position, wherein the first backrest position is a substantially upright position of use and the second backrest position is a substantially horizontal position of non-use relative to a seat extending in a seat direction; and
    a wing rest coupled to the backrest and, when the backrest is in the second backrest position, adapted to be pivoted from a lower armrest position about a second pivot axis extending in the seat direction into an upper armrest position of use to form an armrest,
    wherein, when the backrest is in the first backrest position, the wing rest is arranged on a transverse side of the backrest relative to the seat direction;
    wherein the wing rest comprises
        a support part,
        an upholstery part,
        a height adjusting device between the support part and the upholstery part adapted for a height adjustment of the upholstery part relative to the support part, wherein the support part is pivotally supported on the backrest for rotation about the second pivot axis; and
    wherein the backrest has a front side in the first backrest position, wherein a front side of the upholstery part is generally coplanar with the front side of the backrest when the backrest is in the first backrest position, and wherein the front side of the upholstery part forms a top side of the wing rest when the wing rest is in the upper armrest position.

2. The motor vehicle seat according to claim 1, wherein the height adjusting device can be further configured for height adjustment when the backrest is in the first backrest position.

3. The motor vehicle seat according to claim 1, wherein the support part is a rigid carrier plate.

4. The motor vehicle seat according to claim 1, wherein the support part has a support back side and the backrest has a backrest back side, wherein the support back side is configured to be generally co-planar with the backrest back side when the backrest is in the first backrest position and when the backrest is in the second backrest position and the wing rest is in the lower armrest position.

5. The motor vehicle seat according to claim 4, wherein the support back side faces the backrest back side when the wing rest is pivoted about the second pivot axis in the upper armrest position.

6. The motor vehicle seat according to claim 1, wherein the height adjusting device in the upper armrest position of the wing rest is arranged below the upholstery part without protruding of from an edge of the upholstery part in a transverse direction relative to the seat direction.

7. The motor vehicle seat according to claim 6, wherein the height adjusting device in the upper armrest position is arranged entirely below the upholstery part.

8. The motor vehicle seat according to claim 1, wherein a depression is provided in the upholstery part to at least partially accommodate the height adjusting device when the height adjusting device is in a collapsed position.

9. The motor vehicle seat according to claim 8, wherein the depression is closed off to the outside through the support part when the height adjusting device is in the collapsed position.

10. The motor vehicle seat according to claim 1, wherein the height adjusting device comprises at least one of an inflatable or evacuatable cushion between the support part and the upholstery part.

11. The motor vehicle seat according to claim 1, wherein the height adjusting device comprises a joint quadrilateral with four joint axes.

12. The motor vehicle seat according to claim 11, wherein the joint quadrilateral comprises a first pivot lever which is arranged capable of being pivoted about a third pivot axis on the support part and also capable of being pivoted about a fourth pivot axis on the upholstery part and comprises a second pivot lever which is arranged capable of being pivoted about a fifth pivot axis on the support part and also capable of being pivoted about a sixth pivot axis on the upholstery part.

13. The motor vehicle seat according to claim 12, wherein the third pivot axis, the fourth pivot axis, the fifth pivot axis, and the sixth pivot axis of the joint quadrilateral are arranged parallel to one another.

14. The motor vehicle seat according to claim 12, wherein the third pivot axis, the fourth pivot axis, the fifth pivot axis, and the sixth pivot axis of the joint quadrilateral are arranged at a substantially right angle to the seat direction.

15. The motor vehicle seat according to claim 1, wherein the wing rest is a first wing rest and the transverse side is a first transverse side relative to a seat direction, and wherein the motor vehicle seat further comprises a second wing rest arranged on a second transverse side of the backrest, wherein the second wing rest is adapted to be pivoted about a third pivot axis.

16. The motor vehicle seat according to claim 15, wherein the second and third wing rests can be respectively pivoted about the first pivot axis and the second pivot axis independently of each other or are adjustable in height independently of each other.

17. A seat arrangement, comprising:
   a first motor vehicle seat, said first motor vehicle seat comprising:
   a seat part extending in a seat direction;
   a backrest adapted to be pivoted from a first substantially upright position of use into a second substantially horizontal position of non-use;
   a wing rest, when the backrest is in the substantially horizontal position, is adapted to be pivoted from a lower armrest position of non-use about a pivot axis extending in seat direction into an upper armrest position of use to form an armrest, wherein, when the backrest is in the substantially upright position, the wing rest is arranged on a transverse side of the backrest relative to the seat direction;
   wherein the wing rest comprises
      a support part;
      an upholstery part;
      a height adjusting device between the support part and the upholstery part adapted for a height adjustment of the upholstery part relative to the support part, wherein the support part is pivotally supported on the backrest for rotation about the second pivot axis; and wherein the backrest has a front side in the first backrest position, wherein a front side of the upholstery part is generally coplanar with the front side of the backrest when the backrest is in the first backrest position, and wherein the front side of the upholstery part forms a top side of the wing rest when the wing rest is in the upper armrest position; and
   a second motor vehicle seat that is arranged in a seat row next to the first motor vehicle seat, wherein the wing rest is arranged on a side of the first motor vehicle seat between the backrest and the second motor vehicle seat.

18. The seat arrangement according to claim 17, wherein further comprising a third motor vehicle seat is provided in the seat row, wherein the first motor vehicle seat is arranged between the second motor vehicle seat and the third motor vehicle seat.

* * * * *